(12) United States Patent
Mahawili

(10) Patent No.: US 8,049,351 B2
(45) Date of Patent: Nov. 1, 2011

(54) TURBINE ENERGY GENERATING SYSTEM

(75) Inventor: Imad Mahawili, Grand Haven, MI (US)

(73) Assignee: E-NET, LLC, Muskegon, MI (US)

( * ) Notice: Subject to any disclaimer, the term of this patent is extended or adjusted under 35 U.S.C. 154(b) by 648 days.

(21) Appl. No.: 12/138,818

(22) Filed: Jun. 13, 2008

(65) Prior Publication Data

US 2009/0322094 A1 Dec. 31, 2009

Related U.S. Application Data

(60) Provisional application No. 60/944,189, filed on Jun. 15, 2007.

(51) Int. Cl.
F03D 11/00 (2006.01)
F03D 9/00 (2006.01)

(52) U.S. Cl. .......................... 290/44; 290/54

(58) Field of Classification Search .................. 290/43, 290/44, 54, 55; 415/4.5; 60/398
See application file for complete search history.

(56) References Cited

U.S. PATENT DOCUMENTS

| 4,414,814 | A |   | 11/1983 | White |  |
|---|---|---|---|---|---|
| 4,720,640 | A | * | 1/1988 | Anderson et al. | 290/43 |
| 5,315,159 | A | * | 5/1994 | Gribnau | 290/55 |
| 5,517,464 | A |   | 5/1996 | Lerner et al. |  |
| 6,064,123 | A | * | 5/2000 | Gislason | 290/55 |
| 6,285,090 | B1 | * | 9/2001 | Brutsaert et al. | 290/55 |
| 6,664,655 | B2 | * | 12/2003 | Vann | 290/55 |
| 6,700,216 | B1 | * | 3/2004 | Vann | 290/44 |
| 6,952,058 | B2 | * | 10/2005 | McCoin | 290/44 |
| 7,042,109 | B2 | * | 5/2006 | Gabrys | 290/44 |
| 7,116,006 | B2 | * | 10/2006 | McCoin | 290/54 |
| 7,279,803 | B1 | * | 10/2007 | Bosley | 290/54 |
| 7,358,624 | B2 | * | 4/2008 | Bacon | 290/55 |
| 7,417,334 | B2 | * | 8/2008 | Uchiyama | 290/55 |
| 7,471,009 | B2 | * | 12/2008 | Davis et al. | 290/54 |
| 7,550,864 | B2 |   | 6/2009 | Anderson et al. |  |
| 7,582,982 | B1 | * | 9/2009 | Deal | 290/55 |
| 7,605,486 | B2 | * | 10/2009 | Bridwell | 290/43 |
| 2007/0013194 | A1 |   | 1/2007 | Calley |  |
| 2010/0194116 | A1 | * | 8/2010 | Mahawili | 290/55 |
| 2010/0295317 | A1 | * | 11/2010 | Mahawili | 290/55 |

FOREIGN PATENT DOCUMENTS

KR 1020050021214 3/2005

OTHER PUBLICATIONS

PCT Search Report mailed Oct. 23, 2008 for PCT Application No. PCT/US2008-067113.

* cited by examiner

Primary Examiner — Nicholas Ponomarenko
(74) Attorney, Agent, or Firm — Warner Norcross & Judd LLP

(57) ABSTRACT

A power generating turbine includes a rotary shaft having an axis of rotation, a magnet supported by and spaced outwardly from the rotary shaft and a conductive coil. The coil located outwardly from the magnet and surrounds the magnet and the shaft, but is sufficiently close to the magnet such that rotary movement of said magnet induces current flow in the coil.

15 Claims, 9 Drawing Sheets

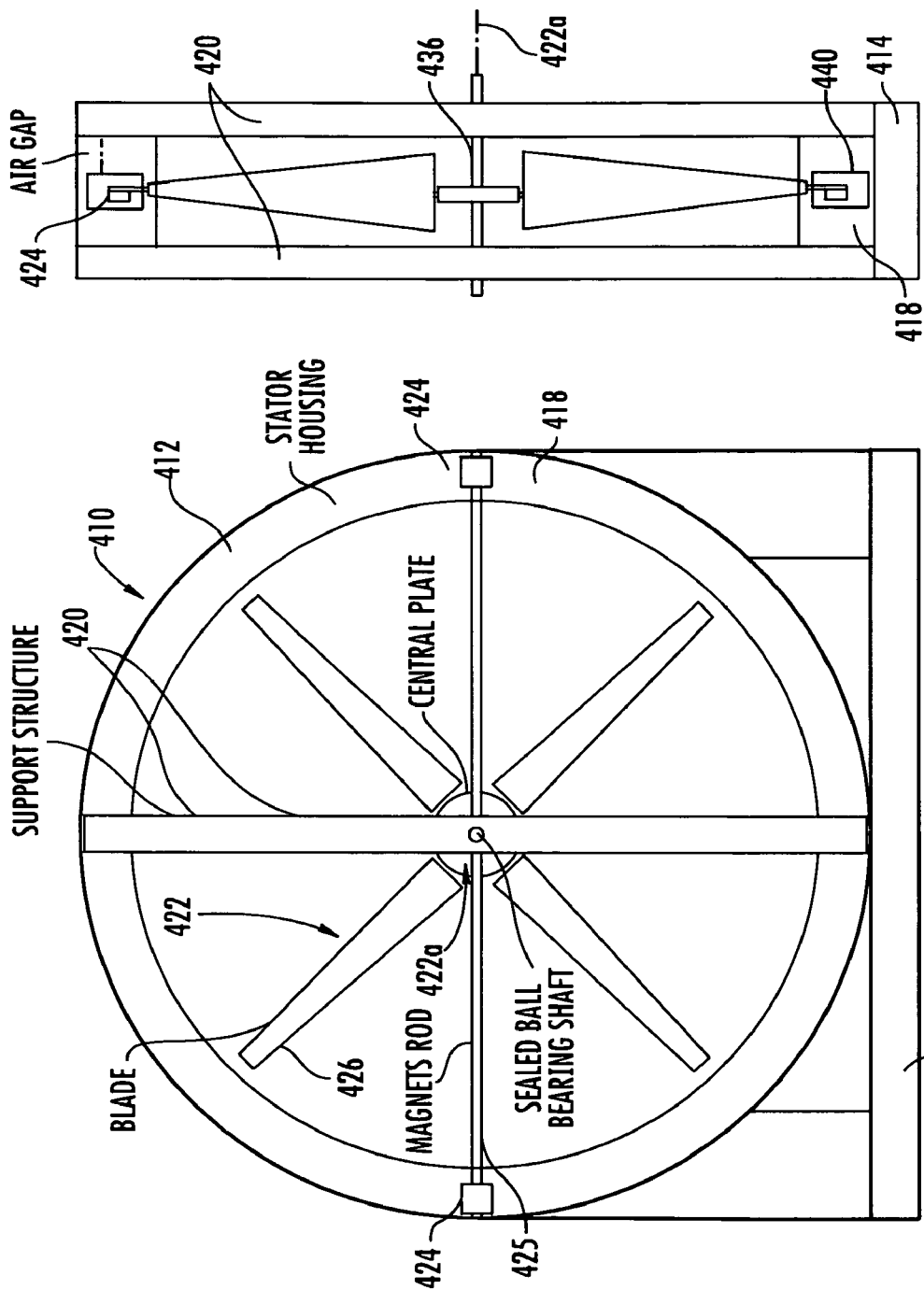

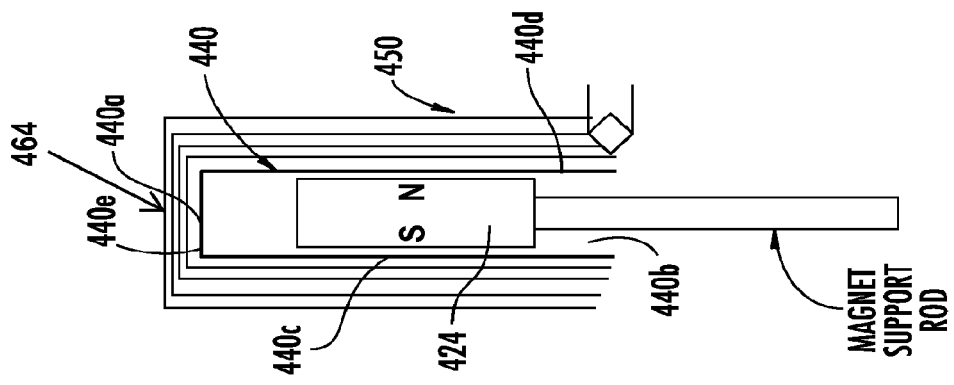
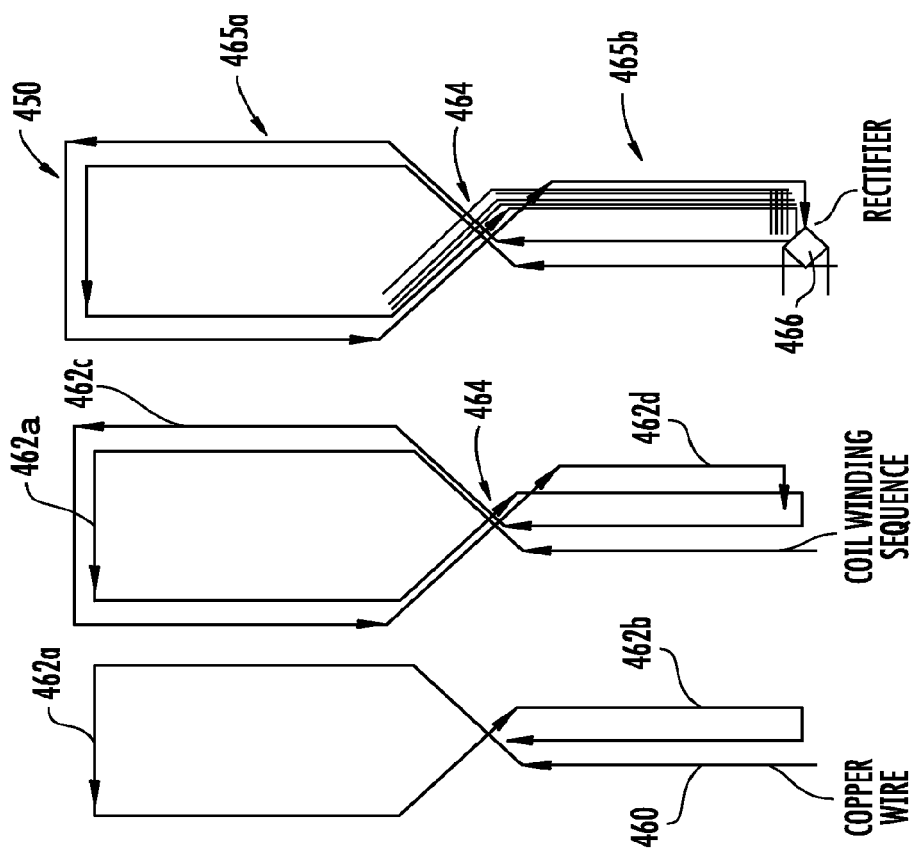

TURBINE ENERGY GENERATING SYSTEM

CROSS-REFERENCE TO RELATED APPLICATION

The present invention claims the benefit of provisional application Ser. No. 60/944,189, entitled TURBINE ENERGY GENERATING SYSTEM, filed on Jun. 15, 2007, which is incorporated by reference herein in its entirety.

TECHNICAL FIELD AND BACKGROUND OF THE INVENTION

The present invention relates generally to a turbine energy generating system and, more particularly, to a turbine energy generating system that may operate at relatively low pressures while still producing significant energy levels.

SUMMARY OF THE INVENTION

Accordingly, the present invention provides a turbine energy generating system that includes a turbine that requires low torque levels to operate the turbine and an optional engine that can operate at lower pressures while still producing sufficient torque to operate the turbine. Further, the turbine energy generating system can be assembled using relatively simple and inexpensive components and, further, can be constructed so that it is portable and can run on steam that can be produced from small scale steam generator.

In one form of the invention, a turbine includes a rotary shaft having an axis of rotation, a plurality of magnets supported by and spaced outwardly from the axis of rotation and the rotary shaft, and a coil. The coil is located outwardly from the magnets, such that the coil surrounds the magnets and the shaft.

In one aspect, the magnets are mounted to the shaft by arms. In a further aspect, the shaft is mounted in a housing in a transverse passageway that extends through the housing. In addition, arms may include vanes so that the turbine can be powered by air flowing into the transverse passageway.

According to yet another embodiment, the turbine is combined with an engine, with the engine coupled to the shaft for rotating the shaft. The engine may be coupled to the shaft by a linkage. Optionally, the shaft includes a clutch so that the shaft can be rotated independently of the engine, for example manually or powered by air or water.

In another form of the invention an engine includes a first member defining a chamber and having an inlet port and an output port, with the ports being in selective fluid communication with the chamber, an expandable wall extending from the first member, and a diaphragm coupled to the expandable wall spaced from the first member. The diaphragm is movable relative to the first member in response to pressure in the chamber. The engine further includes a force generator that generates a force to urge the diaphragm toward the first member to increase pressure in the chamber. The flow of fluid into and out of the chamber through the ports is controlled by a control system which controls the flow of fluid into and out of the chamber in response to the position of the diaphragm to thereby control the movement of the diaphragm. The movement of diaphragm may then be used as input, for example, to drive a turbine shaft.

In one aspect, the force generator comprises a second member and a second expandable wall. The second member and the second expandable wall define a second chamber, with the diaphragm coupled to the second expandable wall. The control system controls the flow of fluid into and out of the second chamber through inlet and outlet ports of the second member in response to the movement of the diaphragm.

In other aspects, the expandable walls comprise bellows, including rubber bellows. Optionally, each of the rubber bellows incorporates a coil spring in the wall of the bellow, which generates a biasing force on the diaphragm.

In yet another aspect, the control system includes a pair of sensors for detecting the position of the diaphragm. For example, the sensors may comprise proximity switches, which are actuated by contact with the diaphragm itself or by a projecting flange or tab that extends from the diaphragm. Alternately, the diaphragm may include a magnet that generates a magnetic field, with the sensors detecting the magnetic field to detect the position of the diaphragm.

According to yet another aspect, the second member includes a coupler for coupling to a turbine, with the coupler moving with the second member in a linear path. For example, the coupler may be coupled to the rotary shaft of the turbine.

Accordingly, the present invention provides a turbine generating energy system that operates on low pressure. The turbine has very low torque requirements such that the turbine may be manually operated or driven by air or water. Further, the system may incorporate a positive displacement engine that operates with very low friction and, hence, can operate with lower pressures than conventional engines. Further, the engine may be used in conjunction with the turbine so that the resulting combination of the engine and the turbine is a turbine energy generating system that can produce electricity far more efficiently than heretofore known. Further, the turbine and engine may be configured so that they are portable. Moreover, the turbine can be driven without the engine either manually or using wind or water power.

These and other objects, advantages, purposes, and features of the invention will become more apparent from the study of the following description taken in conjunction with the drawings.

BRIEF DESCRIPTION OF THE DRAWINGS

FIG. 5 is a front elevation view of yet another embodiment of turbine of the present invention;

FIG. 6 is a side elevation view of the turbine of FIG. 5;

FIG. 7 is a schematic drawing of the stator coil assembly of the turbine of FIG. 5;

FIG. 8A-8C illustrate the winding arrangement and sequence of winding of the copper wire that forms the coil;

DESCRIPTION OF THE PREFERRED EMBODIMENT

Figure 2:
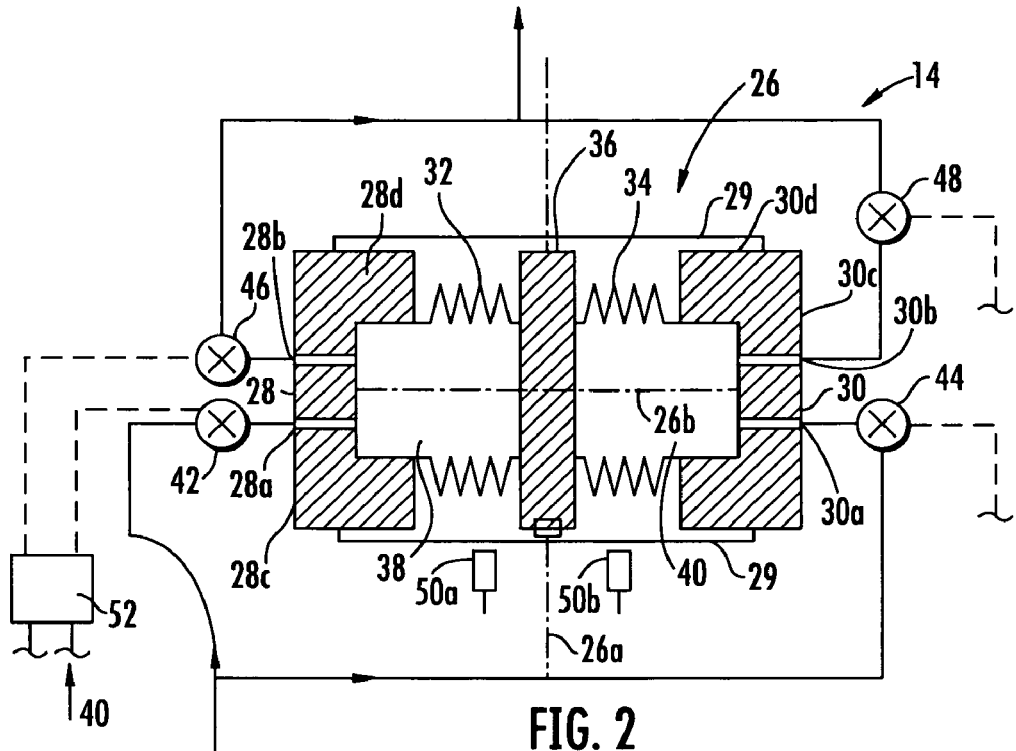
FIG. 2 is an enlarged schematic view of the engine of the present invention.
Figure 1:
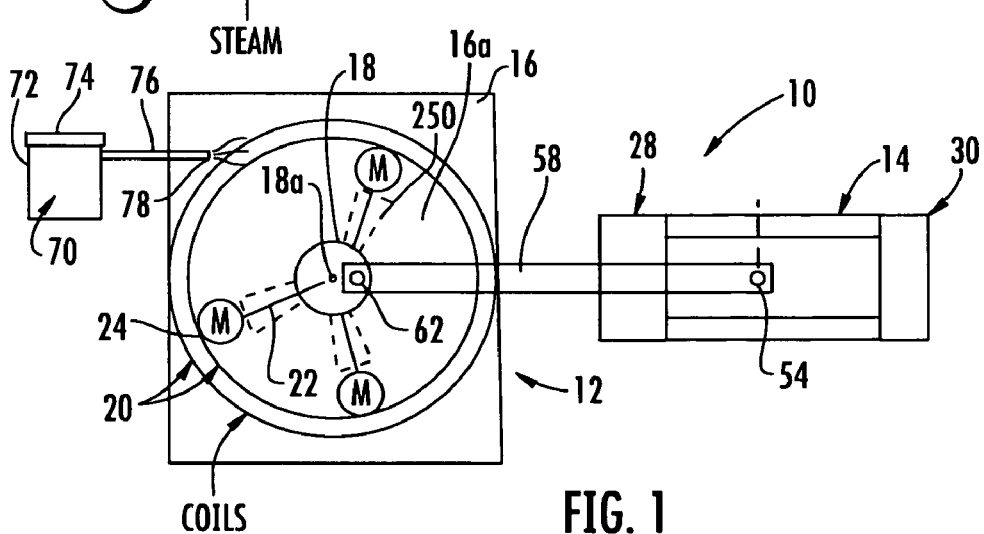
FIG. 1 is a schematic view of the turbine energy generating system of the present invention.

Referring to FIG. 1, the numeral 10 generally designates a turbine energy generating system that can operate at low pressures, for example at 15 psi or lower. Turbine energy generating system 10 includes a turbine 12 and an engine 14 for optionally powering the turbine. As will be fully described below, turbine 10 is configured so that its torque requirements are significantly less than a conventional turbine of comparable output. Similarly, engine 14 is a positive displacement engine that operates with minimal friction and, therefore, can operate at very low pressures, including pressures below 15 psi and down to 1 psi while still delivering sufficient torque to run the turbine. Consequently, system 10 can generate electricity with reduced energy requirements. Optionally, as will be more fully described below, the turbine may be configured to be manually powered or powered by a fluid, such as wind or water.

As best seen in FIG. 1, turbine 12 includes a housing 16, a rotatable shaft 18, which is supported in housing 16, and a plurality of coils 20. Mounted to shaft 18 are a plurality of arms 22 that support magnets 24, which are optionally mounted at the ends of arms 22. While shaft 18 is shown only with three arms; it should be understood that the number of arms may be increased, for example to four arms, six arms, or more, or may be reduced to two arms. Coils 20 are arranged around and spaced apart from shaft 18 and arranged around magnets 24 so that when magnets 24 are rotated, magnets 24 induce current flow in the coils. As would be understood, the coils are then coupled to a circuit that delivers the electricity from the turbine to a desired application.

Unlike conventional turbines where the coils are located at the shaft, the present invention provides a turbine with coils that surround the ends of the turbine blades or arms to thereby take advantage of the angular speed at the tips of the turbine blades. Because the magnitude of induced current is a function of the speed of the magnetic field across the coils, the magnitude of the induced current flow of the turbine of the present invention significantly exceeds the current flow of a conventional turbine for a given turbine shaft speed. With the present arrangement, therefore, the same level of induced current flow can be achieved with a much lower shaft speed (rpm) and, further, with a much lower torque than a conventional turbine.

Referring again to FIG. 1, shaft 18 is coupled to engine 14, which generates linear motion that induces rotary motion in shaft 18. As best seen in FIGS. 2 and 2A-2E engine 14 includes a housing 26 that is formed by two end members 28 and 30 and two extendable walls 32 and 34. Coupled to the two extendable walls is an intermediate member or diaphragm 36, which defines two chambers 38 and 40, with chamber 38 defined between end member 28, extendable wall 32, and diaphragm 36, and chamber 40 defined between end member 30, extendable wall 34, and diaphragm 36.

Figure 2A:
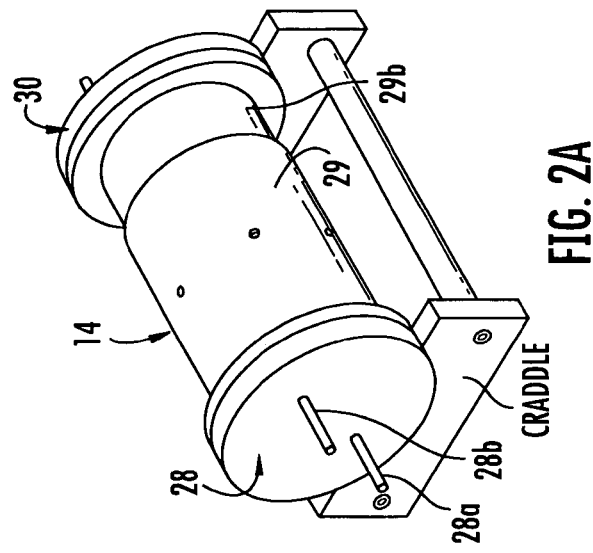
FIG. 2A is a perspective of the engine of the present invention illustrating the engine supported on a cradle.
Figure 2C:
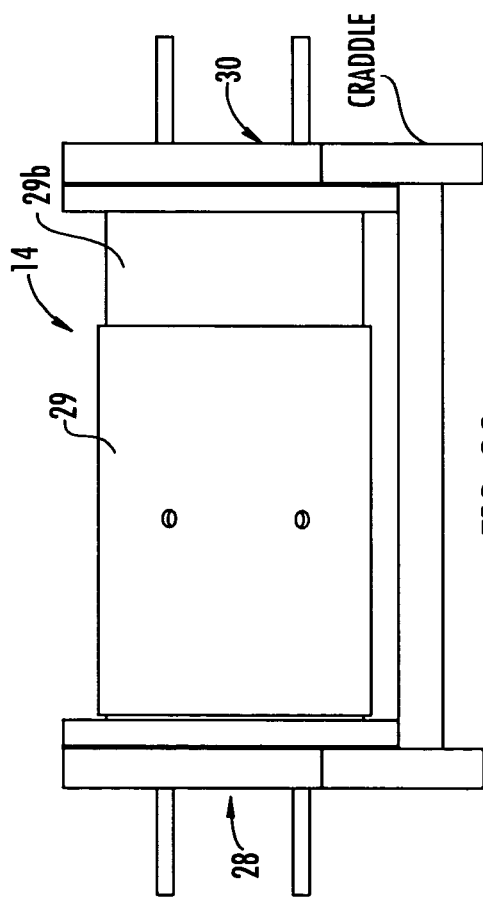
FIG. 2C is side elevation view of the engine of FIG. 2A.
Figure 2B:
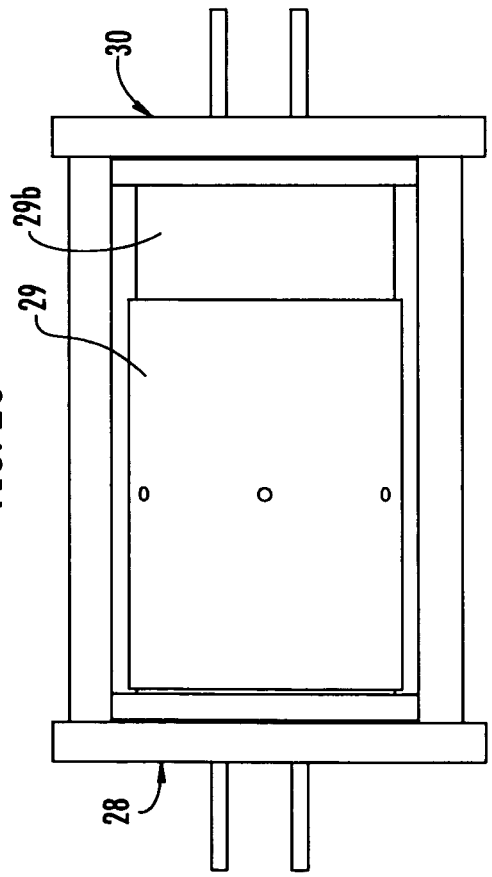
FIG. 2B is a top plan view of the engine of FIG. 2A.
Figure 2D:
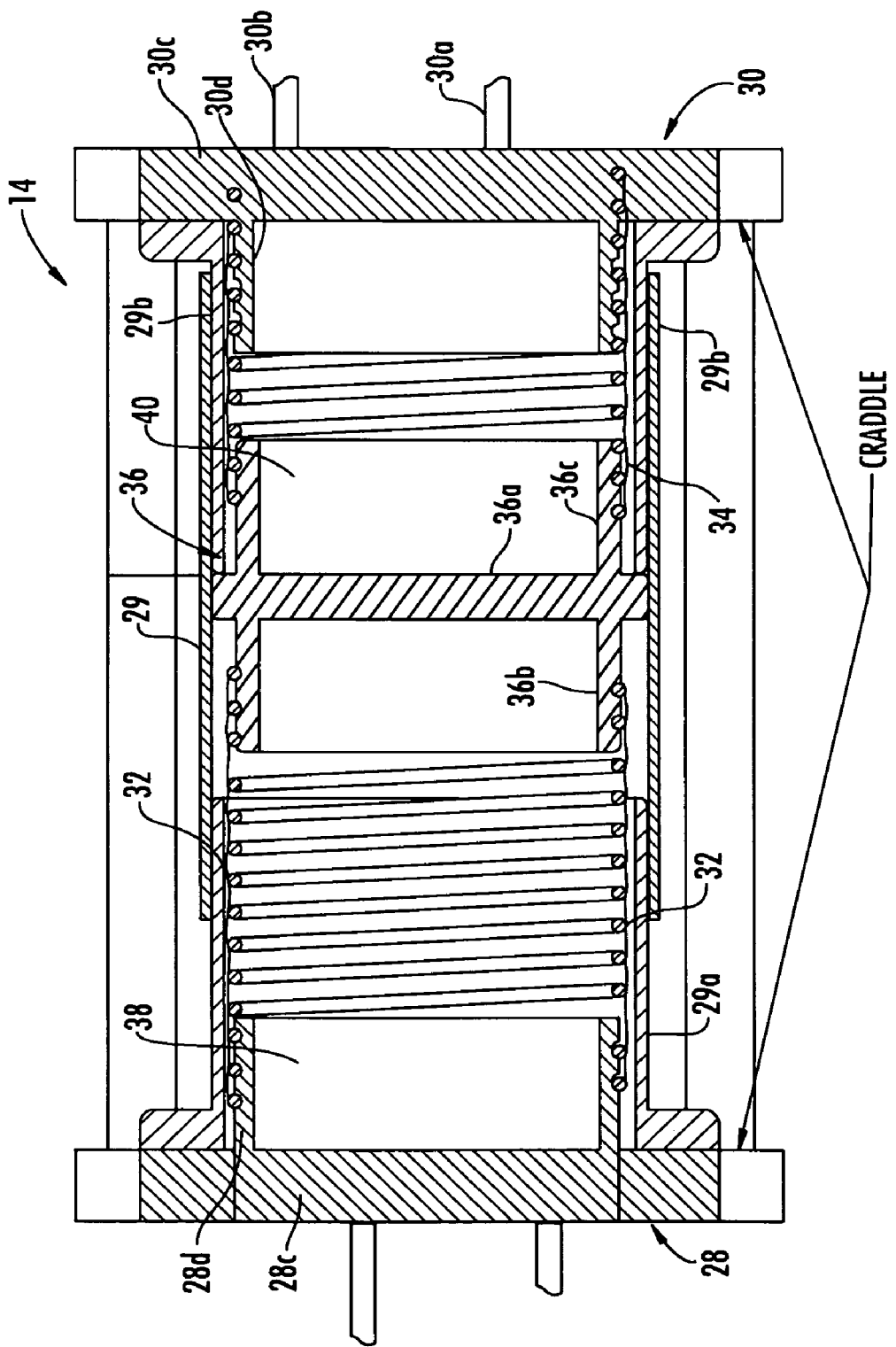
FIG. 2D is an enlarged cross-section of the engine of FIG. 2A illustrating the diaphragm of the engine in a first position.
Figure 2E:
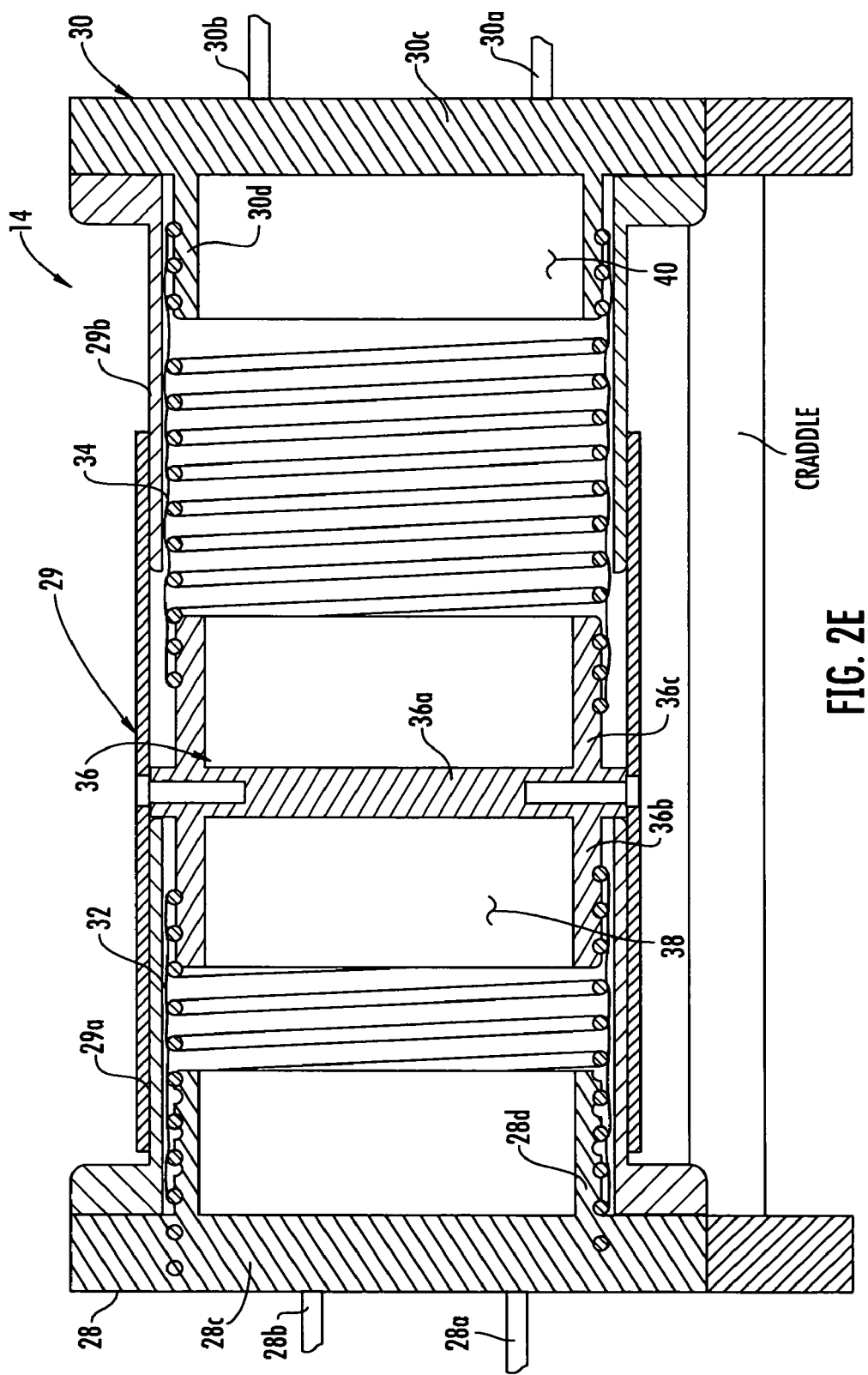
FIG. 2E is a similar view to FIG. 2D illustrating the diaphragm of the engine shifted to a second position.

Referring again to FIGS. 2, 2D, and 2E, each end member 28, 30 include an inlet port 28a and 28b and an outlet port 30a and 30b. Further, each end member 28, 30 includes an end wall 28c, 30c and a projecting flange 28d, 30d. Flanges 28d and 30d form cylindrical cavities and are coupled to extendable walls 32 and 34, for example by screw connection. As best seen in FIGS. 2C and 2D, diaphragm 36 similar includes a central wall 36a and a pair of projecting flanges that form cylindrical cavities and which are also screwed on to the expandable walls 32, 34. Inlet ports 28a and 30a extend through end walls 28c and 30c and are in fluid communication with chambers 38 and 40 and in selective fluid communication with a supply of energy, such as steam or other gas, including combustible gas. For ease of description, the following description will refer to fluid; though it should be understood that fluid includes steam, gas, including combustible gas, or other fluids.

The flow of fluid through inlet ports 28a and 30a is controlled by a control system 40 through valves 42, 44, such as solenoid valves. Similarly, the flow of fluid through outlets 28b and 30b is controlled by control system 40 through valves 46 and 48. In addition, control system 40 includes a plurality of sensors 50a and 50b, which detect the position of diaphragm 36 and which provide feedback to a controller 52 of control system 40. For example, controller 52 may comprise a relay switch or a central processor.

In operation, control system 40 opens valve 42 to allow fluid to flow into chamber 38 and opens valve 48 to allow fluid in chamber 40 to discharge. As chamber 38 is pressurized, the pressure applies a force diaphragm 36 which causes diaphragm 36 to move to the right (as seen in FIG. 2D), which causes the fluid in chamber 40 to be pressurized and exit through outlet port 30b and through open valve 48 for discharge. Once sensor 50b detects that diaphragm 36 has reached a predetermined position to the right of central transverse axis 26a of housing 28, sensor 50b will generate a signal to controller 52, which in turn will close valves 42 and 48 and open valves 44 and 46. As a result, the fluid will be redirected to chamber 40, which will increase the pressure in chamber 40 and, hence, apply a pressure force against diaphragm 36 to move diaphragm 36 to the left as seen in FIG. 2C. As diaphragm 36 moves to the left, the pressure in chamber 38 increases causing the fluid in chamber 38 to flow through outlet port 28b and through valve 46. When sensor 50a then detects that diaphragm 36 has moved to a predetermined position to the left of axis 26a, sensor 50a will again send a signal to controller 52, which triggers controller 52 to reopen valves 42 and 48 and close valves 44 and 46. This process is repeated with control system 40 providing a switching function for engine 14.

This switching function results in a reciprocal linear movement for diaphragm 36 between the two end members 28 and 30 of housing 26. As best seen in FIGS. 2B-2E, diaphragm 36 is supported between the two end members by a movable outer cylindrical wall 29, which in turn is supported on a pair of flanged collars 29a and 29, which mount to end members 28 and 30. Diaphragm 36 is secured to outer cylindrical wall, for example, by fasteners that extend between wall 29 and central wall 36a of diaphragm. At least one of the outer cylindrical wall 29 and the flanged collars 29a, 29 has a low coefficient of friction to reduce the friction between wall 20 and collars 29a and 29b when wall 29 moves with diaphragm 36. As will be more fully described below, the linear movement of intermediate member 36 is used to induce rotary motion in shaft 18 to thereby generate electricity.

Referring back to FIG. 1, intermediate member 36 is provided with a coupler 54, which is in turn coupled to a link or arm 58. Link or arm 58 is coupled to shaft 18 by a pin connection 62 at the end of shaft 18, which is offset from the axis of rotation 18a of shaft 18. Link or arm 58 is also pinned to coupler 54 (coupler 54 may be journaled in link or arm 58) so that link or arm 58 may pivot about coupler 54 and, thereby, act as a crank for shaft 18, as would be understood by those skilled in the art.

As intermediate member 36 moves along axis 26b, arm 58 shifts to the left (as viewed in FIG. 1) and rotates shaft 18 about axis 18a. Once shaft 18 is initially rotated, the weight of arms 22 and magnets 24 will complete the rotation of the shaft until connection 62 is repositioned below axis 18a at which point sensor 50a will detect that intermediate member 36 has shifted to its predetermined position to the left of axis 26a (as viewed in FIG. 2 and shown in FIG. 2E)) and arm 58 will be returned to the right (as viewed in FIG. 1 and shown in FIG. 2D) and cause controller 52 to initiate the return of intermediate member 36 to its right most position relative to axis 26a (as viewed in FIG. 2) to thereby pull on arm 58. This process is repeated. As noted above, as shaft 18 rotates about axis 18a, magnets 24 generate a magnetic flux, which induces current flow in coils 22 to thereby generate electricity, which can either be used to power a device or stored for later.

Members 28, 30, 36, wall 29, collars 29a and 29b, may be made from a variety of different materials, including metal, such as aluminum, steel, or the like, or polymers, including nylon and reinforced polymers, or a combination thereof. Expandable walls 32 and 34 form bellows and may be formed from metal or from an elastomeric material, including rubber, or a combination of both. Further, members 28, 30, 36 collars 29a and 29b, and walls 29, 32 and 34 are generally cylindrical, though they may have other shapes.

As noted above, turbine 12 requires a lower torque and, therefore, can be operated by engines operating with lower pressure, including pressures below 15 psi and optimally 1 psi or less. This is due to the geometric configuration of the turbine. Further, turbine 12 may be manually operated or drive by wind power or water power, more fully described below.

Further, as noted above, sensors 50a and 50b detect the position of diaphragm 36 relative to axis 26a of housing 26. In the illustrated embodiment, intermediate member 36 includes a magnet, which generates a magnetic field that is detected by sensors 50a and 50b. It should be understood that other sensing devices may be used, including proximity sensors that make direct contact with the diaphragm or a tab or other projecting structure that extends, for example, from central wall 36a. With a bar code, enhanced control over the position of diaphragm 36 may be achieved and the position can be adjusted to increase or decrease the range of motion and hence stroke.

In the illustrated embodiment the magnets are arranged so that their N and S poles are facing in a direction parallel to the shaft's axis of rotation (18a) so that the N and S poles rotate in parallel planes and in a path of the same radius. Optionally to increase the current output of turbine 12 even further, coils 22 may be arranged so that the flux from both sides of the magnets can be used. For example, in addition to being around the ends of the magnets to take advantage of the tip speed of the turbine arms or blades, coils 22 may be arranged to form a channel shaped track about magnets 24 so that the coils form two legs that straddle and face both sides (N and S poles) of the magnets. In order for the current to be additive, the coils are twisted 180 degrees so that the current flowing through each leg is additive to the current flow of the opposed leg. The twist should be located at the base or head of the channel (at the tip of the magnet) so as not to interfere with the induced flow of current.

Figure 3:
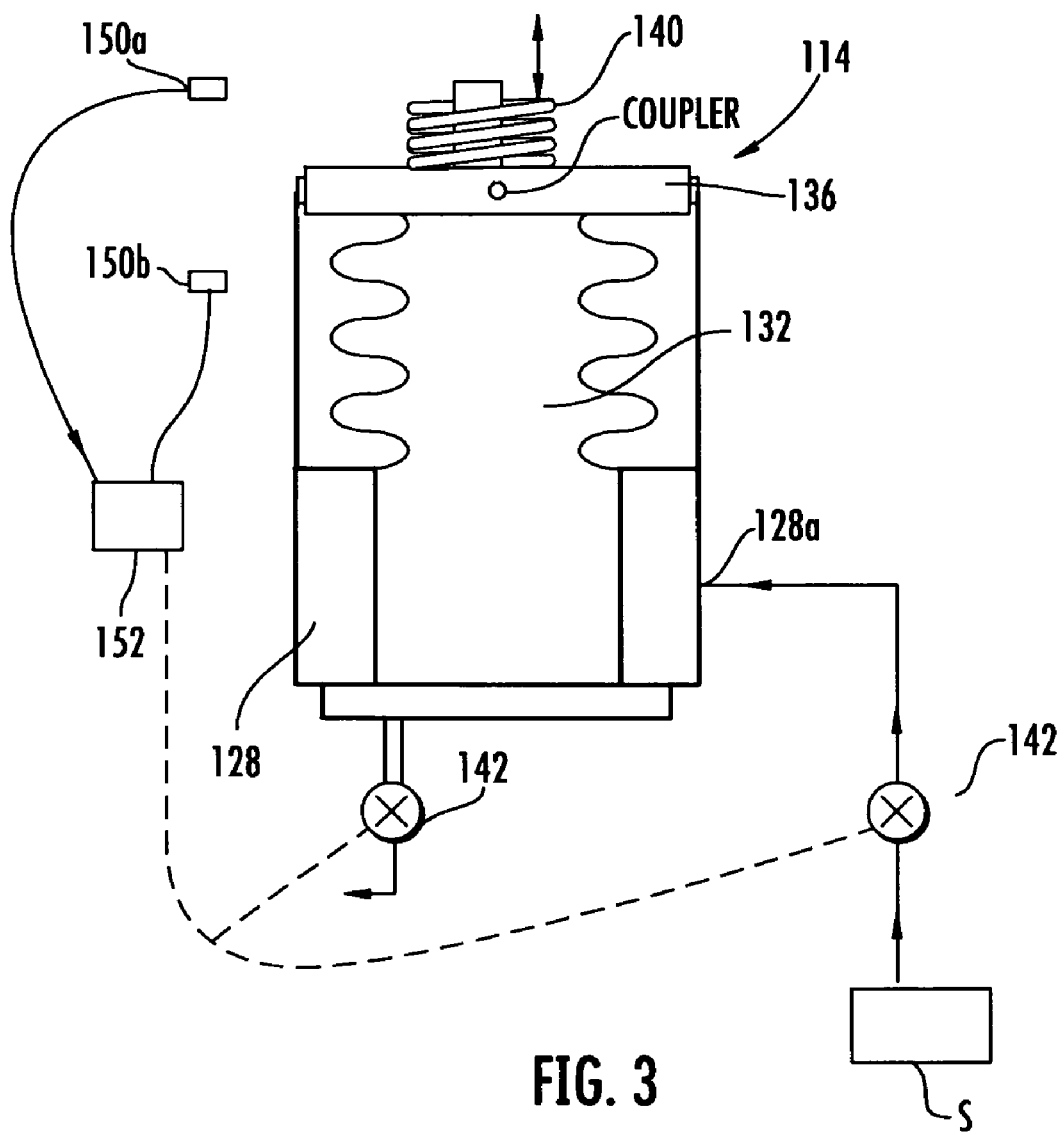
FIG. 3 is a schematic view of a second embodiment of the engine of the present invention.

Referring to FIG. 3, in an alternate embodiment, generator 114 may include a single chamber which is formed between end member 128 and diaphragm 136. Similarly, end member 128 includes an inlet port 128a and an outlet port 128b similar to ports 28a and 28b of the previous embodiment, which allows fluid in chamber 132 to enter and exit chamber 132. To replace the opposed force provided by the pressure in chamber 40, generator 114 includes a force generating member such as a spring 140, which applies a downward force as viewed in FIG. 3 to diaphragm 136.

Generator 114 similarly includes a pair of sensors 150a and 150b, which detect the position of diaphragm 136 and are similarly coupled to a controller 152, which controls the flow of fluid into chamber 132 through inlet port 128 and from chamber 132 from outlet port through a valve 142. For example, valve 142 may comprise a three-way valve, which delivers fluid to chamber 132, such as a gas, such as steam from a supply of steam S, and then redirects the fluid from chamber 132 through valve 142 for discharge.

Additionally, turbine 12 may incorporate vanes 250 (show in phantom in FIG. 1) so that turbine 12 can be driven by wind power or water power, or steam power described below. Vanes 250 are commonly known and are typically made from a thin sheet of material, such as metal or plastic, and may be removable mounted to arms 22, for example by fasteners. Vanes 250 are optionally tapered so that their greatest width is at their ends distal from shaft 18. Further, the vanes are angled or tilted relative to arms 22 so that when fluid, such as air, water or steam, flows into housing, the vanes will generate sufficient torque on shaft 18 to induce rotation. As best seen in FIG. 1, housing 16 includes a central transverse through passage 16a, with shaft 18 and arms and magnets 24 located in passage 16a. In this manner, when turbine 12 is positioned so that passage aligns with the wind or water, the wind or water will generate a force on the vanes, which will in turn rotate shaft 18. Where turbine 12 is coupled to engine 14, shaft 18 optionally includes a clutch so that turbine can decouple from linkage when wind power or water is available.

Optionally, a handle may be mounted to shaft 18 of the turbine so that the turbine may be manually power. Again, the shaft may include a clutch to decouple the engine from the shaft. Alternately, the linkage may be provided with a quick disconnect mechanism so that the engine may be manually decoupled.

Further, as noted above, turbine vanes 250 may be powered by steam. Referring again to FIG. 1, system 10 may incorporate a second steam generator 70, which is formed by an open ended container 72, but which includes a cover 74 that closes the open end at least partially. For example, cover 74 may fit tightly over the open end but just rest on the top of container 72.

Container 72 holds water, which is heated by burning a variety of gas, liquid, and/or solid fuels. To direct the steam out of container 72, container 72 includes one or more tubes 76 that are in fluid communication with the container's chamber so as to direct the steam that is generated in the chamber out of the container through the distal open ends of the tubes. For example, the tubes may have outer diameters in a range of 0.125 inches and larger. As the water boils a fast flowing jet of steam emits from the open end or orifice of the tube or tubes (76). Tube or tubes 76 may then be directed at the vanes 250 of the turbine-generator. Optimally, the tubes are focused on one or more of the vanes; thus in times when the wind is not blowing, and to maintain a low cost of the system, such water boiling system can effectively run the turbine and thus generate electricity. The steam that hits the vanes would then condense and can be collected as potable water in a base container tray (not shown). The pressure of the steam can be increased by adding simple weights on the container cover thus increasing the steam flow rate and yet maintaining safety and low cost.

Figure 4:
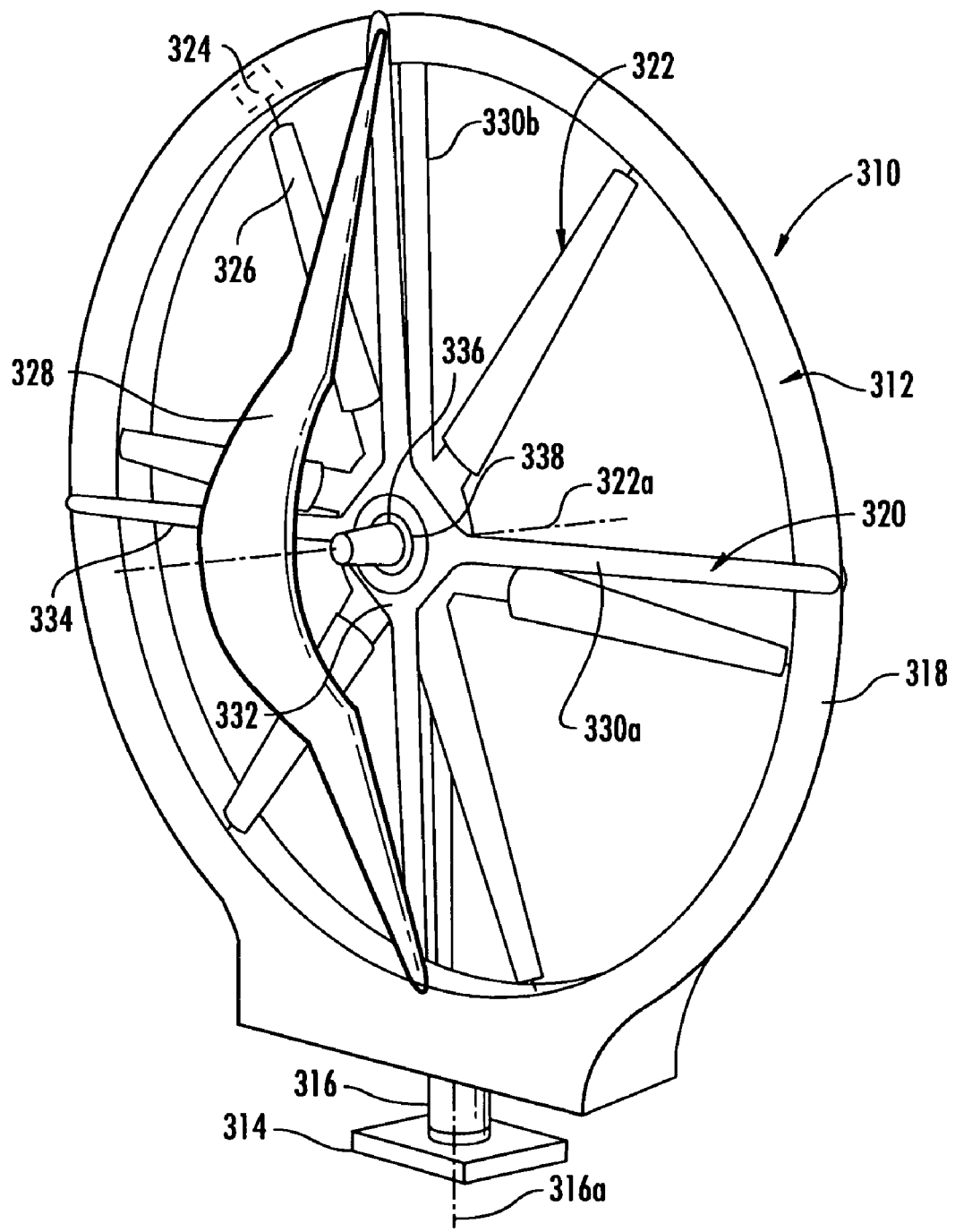
FIG. 4 is a perspective view of another embodiment of a turbine of the present invention.

Referring to FIG. 4, the numeral 310 generally designates another embodiment of the turbine of the present invention. In the illustrated embodiment, turbine 310 is configured as a wind turbine and includes a frame 312, which is mounted to a base 314 and optionally rotatably mounted to base 314 on a pivot shaft or post 316. Frame 312 includes an outer perimeter member 318 and a brace assembly 320, which is supported by the perimeter member 318 and provides a mounting surface for the turbine blade assembly 322. In a similar manner to turbine 12, turbine 310 includes a plurality of magnets 324, which are mounted to the distal ends of the respective blades 326 of turbine blade assembly 322. As will be more fully described below, magnets 324 are positioned in relatively close proximity to a stator coil assembly so that when the turbine blade assembly 322 is rotated about its rotational axis 322a, magnets 324 will induce current flow in the coils of the stator coil assembly.

As noted above, frame 312 may be rotatably mounted on base 314, for example, about a rotational axis 316a. Optionally, mounted to frame 312 is a wind vane 328, which may be used to automatically point the point frame 312 and turbine blades 322 into the oncoming wind, thereby to maximize the harnessing of energy from the wind.

In the illustrated embodiment, brace assembly 320 comprises a pair of spaced apart cross frame members 330a and 330b. Cross frame members 330a and 330b are mounted to opposed sides of the perimeter frame member 318 and, further, each include a central portion 332 from which their radiating arms 334 extend and between which the turbine blade 322 is mounted by a pivot shaft 336. Pivot shaft 336 extends through and is mounted in corresponding bearings 338 provided in the respective central members 332 of brace assembly 320 to thereby rotatably mount turbine blade assembly 322 in frame 312.

In the illustrated embodiment, turbine blade assembly 322 includes six blades 326, which are evenly spaced around central axis 322a and, further, as previously noted, have magnets 324 mounted at their respective distal ends. It should be understood that the number of blades and magnets may be varied. Further, blades may be designed with aerodynamic profiles so as to optimize energy transfer from the wind to the rotating turbine blade system. For example, such optimized aerodynamic blade profile may employ tapering of the blade extremity to reduce the wind shear and blade deflections at high speeds. While suitable blades may include commercially available blades, which are commonly used in conventional turbines, the blades may alternately be rectangular bars with a wind attack angle between 5° and 10°, which may offer more efficient operation at low wind speeds and, further, can be made at lower cost than conventional blades. It should be understood that the blade design selection and attack angle can be varied for a given turbine size and wind speed operating regime. Further, the shaft may be configured to offer minimal drag to the wind and can be made of an aerodynamic cross-sectional profile, including a round cross-section, depending on the wind regimes and weight considerations. Though described as a wind turbine, turbine 310 may comprise a water turbine so moving water may be used to induce rotation of the turbine blade assembly about its rotational axis.

Magnets 324 are positioned so that they extend into perimeter frame member 318 to align with the stator coil assembly, which is located in perimeter frame member 318, which will be more fully described in reference to FIGS. 7-10B. In this manner, when the shaft rotates about axis 322a, the magnets will translate relative to the stator coil assembly and thereby induce current flow in the coils of the stator coil assembly.

Referring to FIGS. 5 and 6, the numeral 410 generally designates yet another embodiment of the turbine of the present invention. Turbine 410 similarly includes a frame 412 and a base 414 on which the frame is mounted and, further, a turbine blade assembly 422, which is rotatably mounted about a central rotational axis 422a (FIG. 6). Frame 412 similarly includes a perimeter frame member 418 and a brace assembly 420, which provides a mounting surface for the turbine blade assembly 422, similar to brace assembly 320.

In the illustrated embodiment, magnets 424 are mounted to a transverse rod 425, which are supported by central shaft 422a of turbine blade assembly 422. In this manner, rod 425 is independent from turbine blades 426 but rotates in unison with the respective blades by virtue of rotation with shaft 422a. Again, although illustrated with six blades, it should be understood that turbine blade assembly 422 may include 3, 4, 5, or 6 blades or a higher number of blades. Further, more than one rod and set of magnets may be used to double, triple or quadruple the number of magnets in the turbine. With an increased number of magnets, the weight of the rotating system is increased. As a result, with an increased number of magnets, the wind speed at which the turbine can start generating power is lowered. Further, by placement of the magnets at the end of the independent rod, the turbine blades are allowed to deflect under the high wind speeds without affecting the accuracy and placement of the magnets within the stator housing, which may simplify operation and extend elected generation performance. The magnets may also be placed at the distal ends or tips of the respective turbine blades, as previously noted. In smaller turbines, the location of the magnet has less impact on the performance of the turbine; whereas in larger turbines, the location of the magnet being independent of the blade may provide the added benefit noted above.

Referring again to FIG. 5, the blades and the magnetic rod are mounted to shaft by a central plate or disk, which optionally comprises a low mass disk that may be formed from steel; though plastics may also be used. The disk is then rigidly secured to the rotational shaft either by welding or the like, which is optionally supported and mounted to the respective brace assembly 420 in sealed bearings, such as sealed ball bearings.

Similar to the previous embodiment, positioned in perimeter frame member 418 is a stator coil assembly 450 and a stator coil assembly housing 440, which comprises a generally annular channel-shaped member that may extend around the full periphery of perimeter frame member 418 (or 318) or just around a portion of the perimeter frame member. Referring to FIG. 7, stator coil assembly housing 440 has a generally channel-shaped cross section 440a and forms an enclosure with an open side 440b into which the magnets 424 (or 324) extend. Housing 440 is formed from a non-magnetic material, for example, plastic. The internal spacing between the opposed stator housing side walls 440b and 440c is sized to minimize the gap 440d, and provide for example an air gap, between the respective side wall 440b, 440c of the stator housing and the respective magnet 424 (324) to reduce the attenuation of the flux induced by the rotating magnets.

The stator coil assembly 450 is mounted about the stator coil assembly housing 440, which includes a plurality of coils formed from a conductive wire, such as copper or aluminum wire. For example, the coils may be made from a double-loop copper wire of gauges in a range of about ten to twenty-six, which are attached to the outside of housing 440. The copper wire gauge can be varied depending on the turbine size and power output design requirements.

Referring to FIGS. 8A-8C, as noted above, the coils are formed from a conductive wire that is wound in a manner to increase the electric generation efficiency, which will be more fully described below. As would be understood when two magnets are used, stator coils covering slightly larger than half of the turbine circle need to be used to produce a continuous electrical signal. If two magnet shafts are used with four magnets, then stator coils covering approximately a quarter of the turbine circle need to be used to produce the continuous electrical signal. Rectifiers on each coil can then be used to locally generate direct current (DC) signal from each individual coil. If rectifiers are not used then alternating current (AC) is produced. This can be rectified at a later state if needed. The electrical output can then be converted to a standard 12 volt DC to charge a small 12 volt DC car battery or a 120 volt alternating current standard output voltage for direct use. The stator coils may be assembled in sections to produce a continuous electrical signal output and/or can cover the entire turbine for even higher energy efficiency. Both copper and aluminum and other good connecting coil wires may be used. Similar to the previous embodiment, turbine 410 may be rotatably mounted on a base that allows the turbine to move to automatically point the turbine in the oncoming wind or may be mounted to a fixed space.

As noted above, and as best seen in FIGS. 8A-8C, the copper wire 460 may be arranged to form a first loop 462a with the wire crossing back over at a cross-over point or region 464 to form a second loop 462b. The wire is then crossed back to form a third loop 462c and then back again to form a forth loop 462d, as shown by the arrows. This process is repeated to form multiple loops (for example hundreds of loops) to thereby form a coil. This is repeated until the number of turns or loops in the wire is sufficient, for example, hundreds of loops depending on the wire gauge and power generation needed. Further, as noted above, a rectifier 466 may be included in the coil circuit. For example, each group of loops or coil may then be terminated at rectifier 466. Single coils may be joined with other coils at the positive and negative output terminals of each of the rectifiers. The coils can then be physically overlapped for higher electrical generation efficiency. Once the various loops 462a, 462b, 462c, 462d, . . . are formed, they may then be positioned over the stator housing 440 such that the one set of nested loops 465a is positioned adjacent one side of the housing (for example adjacent housing side wall 440b) and the other set of nested loops 465b is positioned adjacent the other side of the housing (for example adjacent housing side wall 440c). The cross-over point or region 464 is then positioned at the end wall 440e of housing 440. In this manner, the two sets of nested loops are separated from the magnet by the housing and straddle the magnet. Some of the coils may be connected separately at given regions of the stator housing and, further, without a rectifier. Further, a direct current voltage can be applied to these coils to create impulse power to assist the initial motion of the turbine blades to overcome static friction, which may be performed automatically or with a manual push button.

Figure 9:
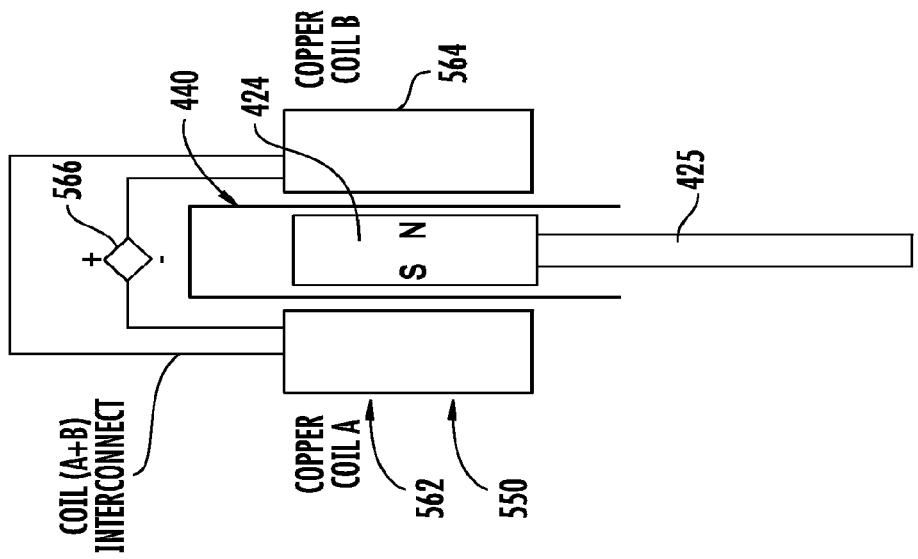
FIG. 9 is another embodiment of a stator coil assembly of the present invention.
Figure 10A:
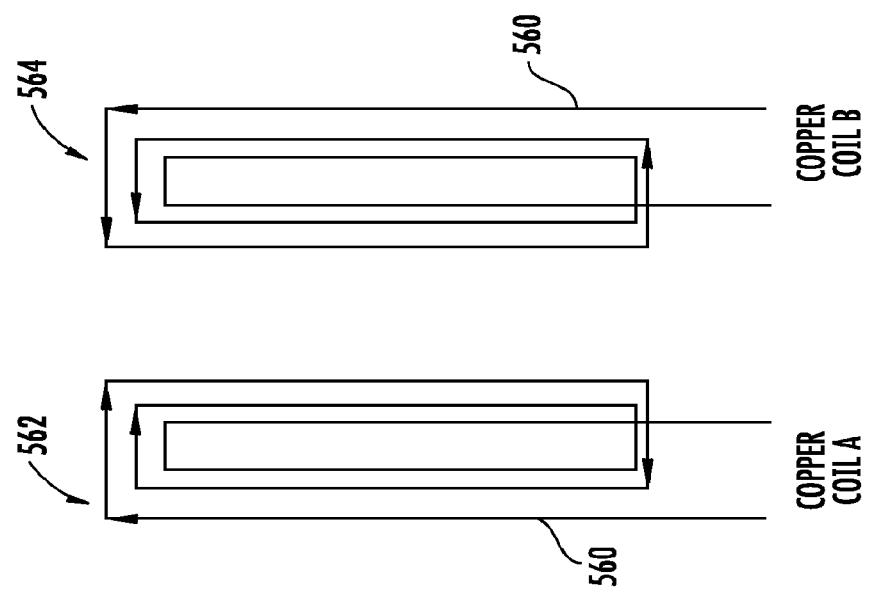
FIGS. 10A and 10B illustrate the copper wire winding that forms the coil of the stator coil assembly of FIG. 9.
Figure 10B:

Referring to FIGS. 9, 10A, and 10B, in an alternate arrangement, the stator coil assembly 550 may be formed from two coils 562 and 564. Each coil 562, 564 is formed from a conductive wire 560, such as copper or aluminum, which is coiled to the manner illustrated in FIGS. 10A and 10B respectively. The coils are then connected in phase, such as the signal of the induced voltage as the magnet passes within the coils proximity is maximized and not minimized or nullified. Further, a rectifier 566 may be added for each double coil assembly.

In this manner, when the magnet or magnets pass by the respective stator coil assembly or assemblies, the magnetic flux caused by the moving magnet induces electrical current to flow through the respective coils. Further, by positioning the coil on either side of the stator housing and, moreover connecting the coils in a manner to have their electrical flow additive, the turbine of the present invention may provide an increased electrical output for a given rotation of a shaft of a conventional turbine. Furthermore, the turbine may generate electricity at lower wind speeds or water flow than heretofore known rather than the conventional turbines in which the magnet and coil are mounted about the rotational shaft of the turbine.

While several forms of the invention have been shown and described, other forms will now be apparent to those skilled in the art. For example, diaphragm 36 or 136 may be supported by a plurality of guides, such as rails or rods or the like. It should be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which I claim an exclusive property right or privilege are defined as follows:

1. A power generating turbine comprising:
   a frame;
   a rotating member having a central axis of rotation and being rotatably supported by said frame;
   a plurality of turbine blades mounted to and supported at said frame by said rotating member and extending radially outward from said rotating member for rotation about said central axis of rotation;
   a magnet spaced outwardly from said central axis and supported by said rotating member radially outward from said central axis, said magnet being mounted to said rotating member by a support independently of said blades wherein the weight of the magnet is not bourne by said blades, said magnet having two sides and being movable in a rotational path about said central axis; and
   a stator coil assembly having first and second conductive coils, said coils located outwardly from said blades and supported by said frame, said coils being located along or adjacent said rotational path, and said coils straddling said magnet when said magnet is moved in said rotational path past said coils and being sufficiently close to said two sides of said magnet such that rotary movement of said magnet induces electrical current flow in said coils from said two sides of said magnet, and said coils being interconnected such that the induced electrical current flow from one side of said magnet is additive to the induced electrical current flow from the other side of said magnet.

2. The turbine according to claim 1, wherein said support comprises a rod.

3. The turbine according to claim 1, further comprising a plurality of magnets.

4. The turbine according to claim 3, further comprising a plurality of said supports, said supports comprising rods, said rods extending outwardly from said central axis, and said magnets supported by said rods.

5. The turbine according to claim 1, wherein said coils form two legs of a stator coil circuit that straddles and faces both sides of said magnet, and said legs being joined by a twisted connection so that the induced electrical current flowing through each leg is additive to the induced electrical current flow of the opposed leg.

6. The turbine according to claim 5, wherein said magnet has a positive pole face, a negative pole face, and a distal side extending between said faces, said twisted connection of said coils being located at said distal side of said magnet so as not to interfere with the induced electrical current flow.

7. The turbine according to claim 1, wherein said coils extend along a portion of said rotational path.

8. The turbine according to claim 1, wherein said coils are interconnected on one side by a rectifier.

9. The turbine according to claim 1, wherein said rotating member comprises a shaft, said shaft rotationally supported by said frame.

10. The turbine according to claim 9, wherein said magnets are mounted to said shaft by a plurality of said supports independent of said blades.

11. The turbine according to claim 9, wherein said blades are mounted to said shaft by a central plate.

12. The turbine according to claim 1, wherein said stator coil assembly includes a housing with a generally channel-shaped cross section into which said magnets extend, said coils located in said housing.

13. The turbine according to claim 9, wherein said magnet is mounted to said shaft by an arm.

14. The turbine according to claim 9, further comprising a rod, said rod forming said support and being mounted to and extending outwardly from said shaft, said magnet mounted to said rod.

15. The turbine according to claim 14, wherein said rod includes two distal ends, said distal ends spaced radially outward from said shaft, and said magnet comprising a pair of magnets, each of said magnets mounted at a respective distal end of said rod.

* * * * *